May 19, 1925.  
J. P. SHAMBERGER ET AL  
ELECTRIC LOCOMOTIVE  
Filed Nov. 20, 1923
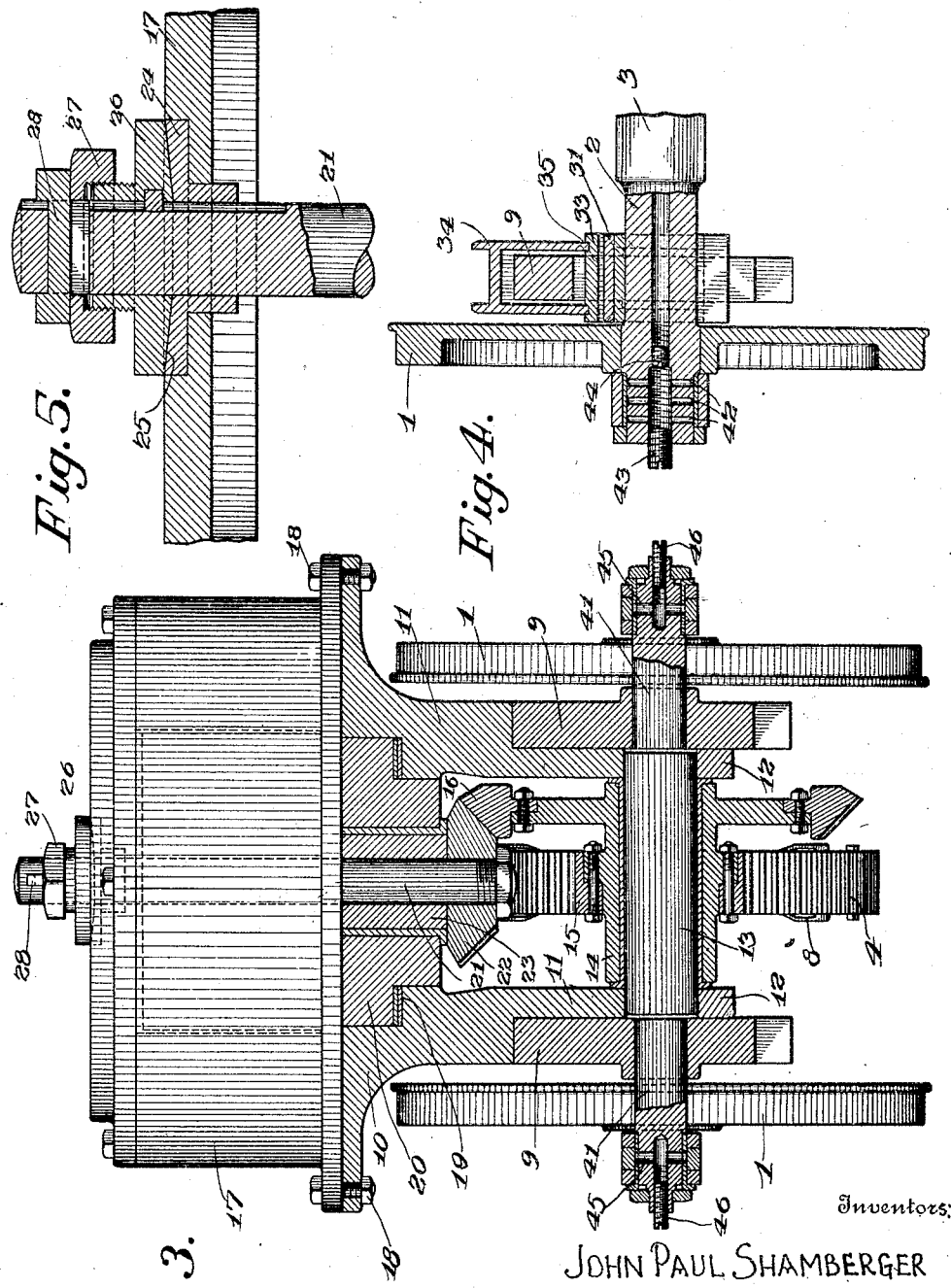
Inventors:  
JOHN PAUL SHAMBERGER  
CLARENCE H. SLAYTON  
By Eccleston & Eccleston  
Attorneys Inventors
JOHN PAUL SHAMBERGER
CLARENCE H. SLAYTON By Eccleston & Eccleston,
Attorneys Patented May 19, 1925.

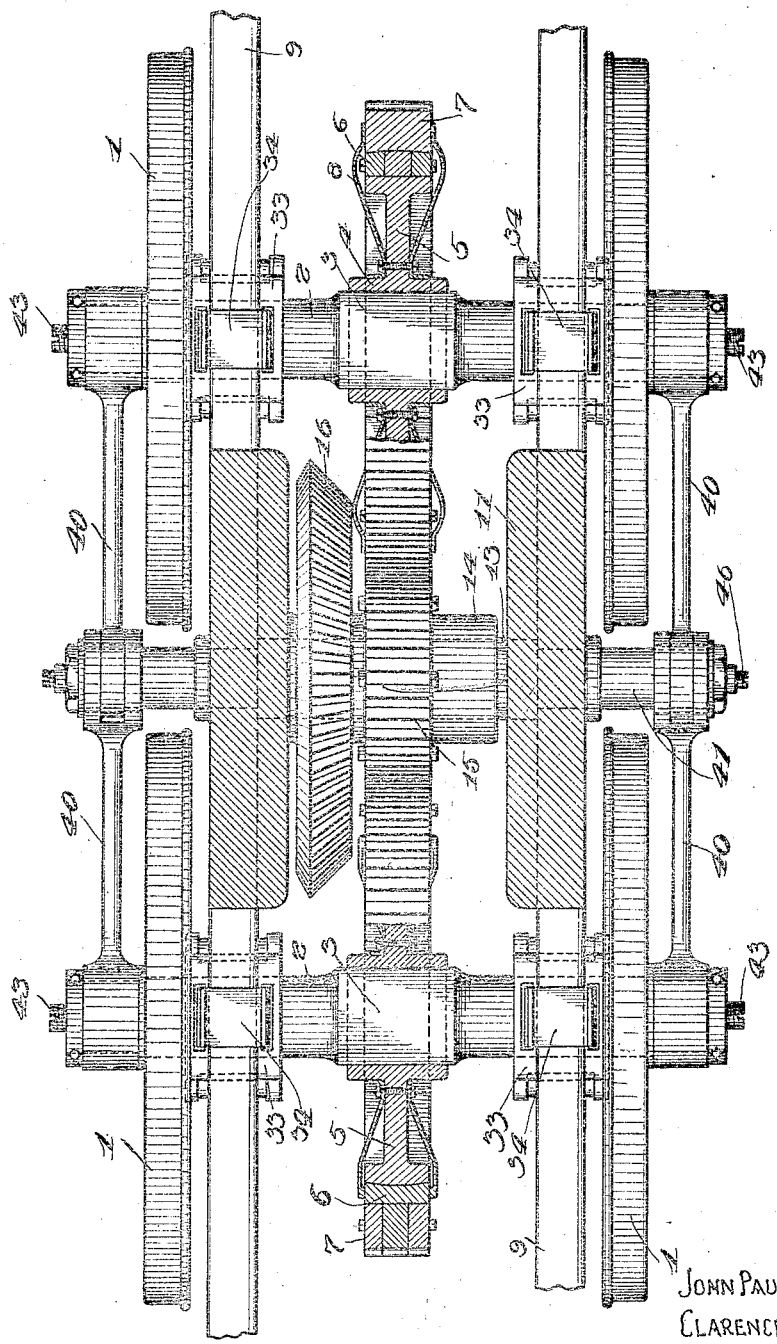

1,538,137

UNITED STATES PATENT OFFICE.

JOHN PAUL SHAMBERGER AND CLARENCE H. SLAYTON, OF OMAHA, NEBRASKA.

ELECTRIC LOCOMOTIVE.

Application filed November 20, 1923. Serial No. 675,856.

*To all whom it may concern:*

Be it known that we, JOHN PAUL SHAMBERGER and CLARENCE HARVEY SLAYTON, citizens of the United States, and residents of Omaha, in the county of Douglas and State of Nebraska, have invented certain new and useful Improvements in Electric Locomotives, of which the following is a full, clear, and exact description.

Our invention relates to electric locomotives and has for its object to provide such a structure which is composed of few parts which are so positioned as to be easily accessible for inspection and repair, and affording ample space so that the various elements may be made sufficiently large to carry the loads necessitated by the requirements of a modern locomotive.

A further object of the invention resides in the arrangement of the elements of an electric locomotive truck so that the same may be operated by a vertically positioned motor geared to the truck axles.

Another object of the invention is found in the provision of a motor foundation which not only forms a support for the motor field but also supports the lower armature shaft bearing and the jack shaft and which also braces the locomotive frames.

A further object of the invention consists in the provision of an adjustable upper bearing for the armature shaft and in a lower armature shaft bearing which will permit a disassembly of the shaft and gear without disturbing associated parts of the apparatus.

Other objects and advantages of the invention will be apparent from the following description when taken in connection with the accompanying drawings; in which, Figure 1 is a side elevation of one of the trucks and showing the vertically arranged motor.

Figure 2 is a horizontal section through one of the truck units with parts broken away.

Figure 3 is a central vertical section through one of the truck units, parts being shown in elevation.

Figure 4 is a fragmentary section through one of the drive wheels and related parts.

Figure 5 is a detail section through the upper armature bearing.

Figure 1:
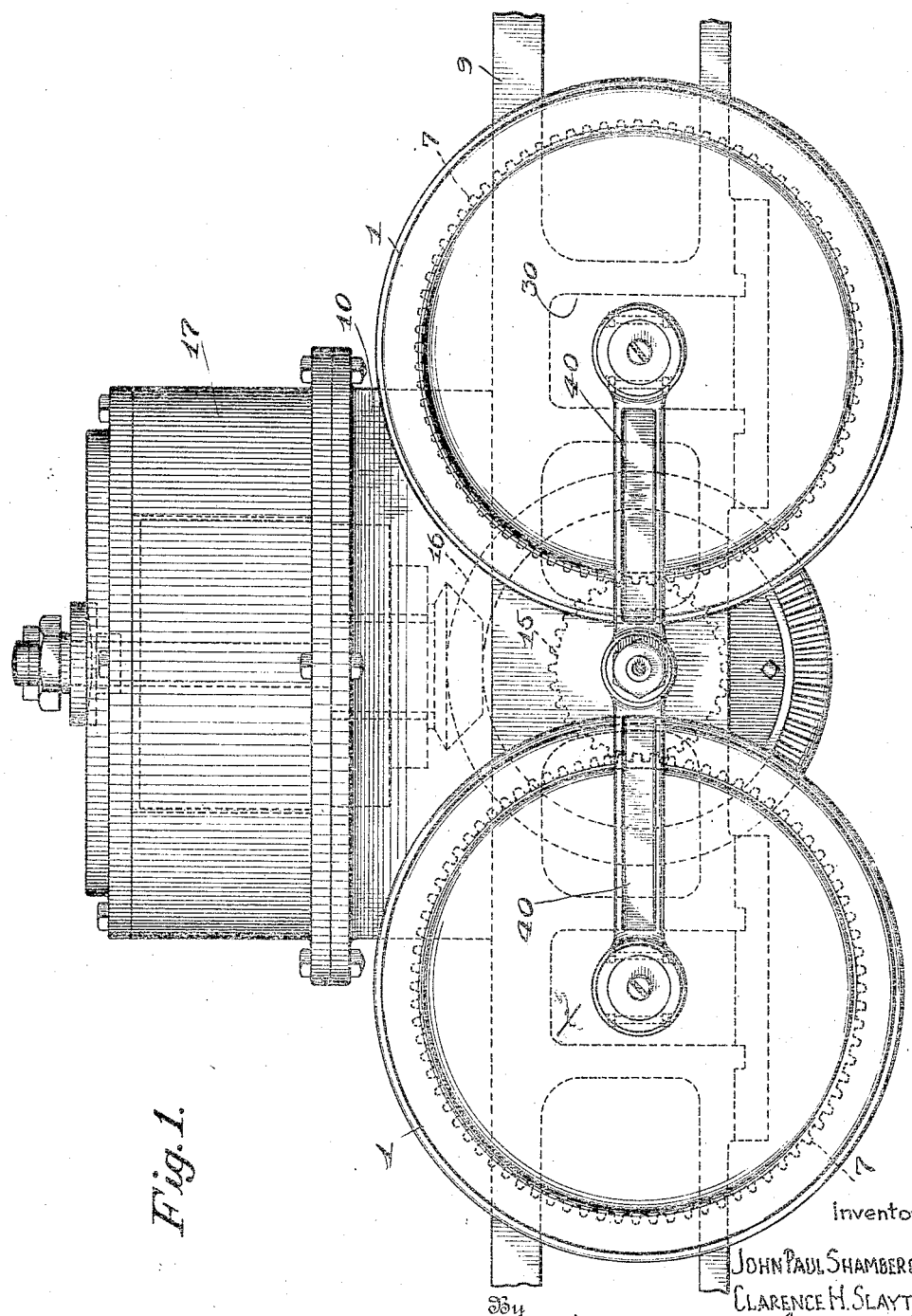

Referring to the drawings in detail the numeral 1 indicates the drive wheels of the truck which are mounted on the axles 2. These axles are squared at their middle portion as indicated by numeral 3, and have mounted thereon a universal spur gear 4. Each universal gear 4 comprises three sections, namely, an inner or hub section 5, an intermediate section 6, and an outer toothed section 7. Portions of these sections are rounded as indicated in Figure 2 and permit of a universal movement of the outer section 7. Springs 8 are provided for normally holding the sections of each spur gear in alignment. The specific construction and operation of the universal gear 4 has been fully described in our copending application #675,857, filed November 19, 1923, and it is believed that further description thereof is unnecessary.

Frame members 9 are mounted on the axles 2 in a manner to be later described, and suitably supported on these frame members 9 is a motor foundation member 10. The member 10 is provided with the downward extensions 11, which, in combination with the caps 12 form supports for a jack shaft 13. Mounted for rotation on the jack shaft 13 is a combined bevel gear and spur gear which are formed from a single casting 14 and provided with detachable teeth-rim sections 15 and 16 bolted to the casting.

The driving motor 17 is secured by means of bolts 18 to the top of the motor foundation 11 and the latter is provided with a seat 19 for the reception of a bearing member 20 for the lower end of the armature shaft 21. A bevel gear 22 is fixedly secured to the lower end of shaft 21 and meshes with the bevel gear 16, and through the latter and spur gear 15 rotates the universal gear 4 and likewise the drive wheels 1. In order to provide for the considerable bearing pressure on the lower journal of the armature shaft a bushing 23 is pressed on the latter as indicated in Figure 3.

The top of the motor is provided with a seat in which is located a bearing 24 of brass or other suitable material. The bearing 24 is slightly conical in form and receives a similarly shaped supporting member 26 which is keyed to the armature shaft 21. The member 26 is screw threaded for the reception of a nut 27 which encircles the shaft 21 and bears against a key 28 which extends through a transverse slot in the upper end of the shaft. By this construction it will be obvious that as the bearing 24 wears down and the gears 16 and 22 mesh deeper the gear 22 may be adjusted to its proper position by means of an adjustment on the nut 27.

The structure thus far described provides means for transferring the power of the electric motor to the drive wheels 1, and we will now describe the manner in which this driving force is communicated to the framework of the locomotive.

Figure 6:
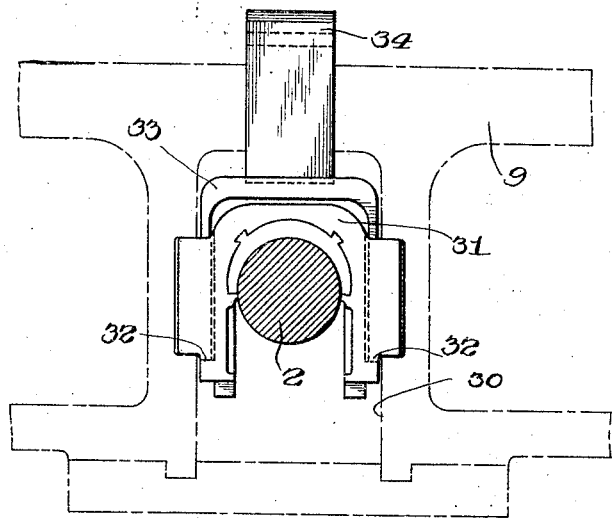
Figure 6 is a detail view of the carrying box.
Figure 8:
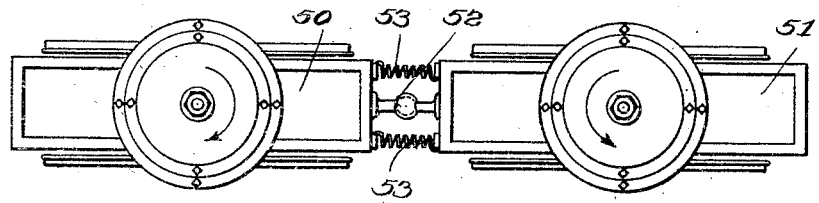
Figure 8 is a plan view of a complete locomotive including two trucks and the motors therefor.

The driving axles 2 extend through open portions 30 of the frame members 9 and as more clearly shown in Figures 4 and 6 are provided with carrying boxes 31 provided with lugs 32 which are located below the center line of the axle 2 so that the weight from the auxiliary spring saddle 33 which bears on said lugs will maintain the carrying box in a vertical position. The spring saddle 34, of course, straddles the frame 9 and has its lower ends positioned in seats 35 formed in the top of the auxiliary spring saddle. The elements just described are adapted for vertical movement in the opening 30 of the frame 9, but it should be noted that they have no contact whatever with the side edges of the opening 30. The reason for this is that we have employed radial driving rods for the purpose of transmitting the driving force from the driving axles to the locomotive frame. Such rods are indicated by the numeral 40 and are provided for each end of the driving axle. The opposite ends of the rods are connected to drive pins 41 which are anchored in the frame 9 and are in concentric alignment with the jack shaft 13. The bearings of these rods on driving axles are lubricated by means of radial slots 42 formed in the ends of the axles, the grease being forced therethrough by means of screw plugs 43. Where hollow driving axles are employed they may be plugged near their ends by means of small screw plugs 44. The driving rod bearings on the driving pins 41 are lubricated by means of radial slots 45 and plugs 46.

From the foregoing description of the power transmitting structure it will be seen that the power from the electric motor which is transferred to the driving axle is from there carried through the driving rods 40 and driving pins 41 to the main frame of the locomotive. This construction allows of a substantially free bodily movement of the axles with respect to the jack shaft 13. Such movement on an uneven track would, of course, ordinarily damage the power transmitting gears and it is for this reason that we have provided the universal gear 4 which adjusts itself to such movements of the axles and thus permits a full-toothed engagement between the gears at all times. It should also be noted that by the use of the drive rods 40 the driving axles 2 are always maintained at a fixed distance from the jack shaft 13.

Figure 7:
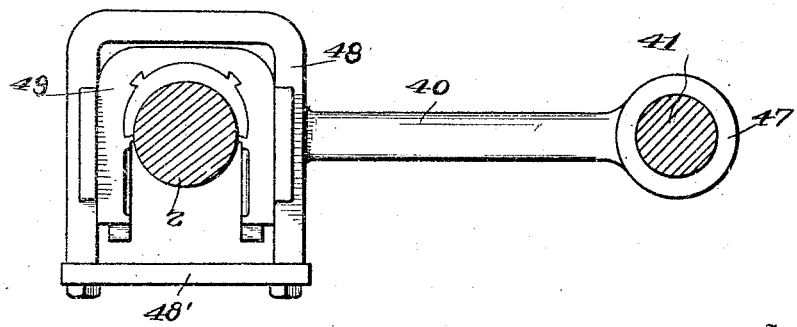
Figure 7 is a detail view of the driving rod attached to a driving box.

Instead of applying the driving rods directly to the axles 2 they may, of course, be attached directly to the usual driving box and in such a structure the usual shoes and wedges would be omitted. Such a structure is disclosed in Figure 7 in which the drive rod 40 has one end 47 constructed to be positioned on the driving pin 41 on the frame of the locomotive; the opposite end being in the form of a yoke 48 which engages over the driving box 49, and is removably secured thereto by means of the bar 48' which is bolted to the yoke 48. This construction will, of course, prevent the driving box from turning on the axle and the auxiliary spring saddle is therefore unnecessary.

Two axles driven by a single motor may be considered as a unit and ordinarily a locomotive would consist of two units. The motors of the two units may turn in the same direction or in opposite directions, and since each unit is perfectly balanced so far as external moment is concerned, there will be no twisting of the units across the track. The two units are indicated by the numerals 50 and 51 and are flexibly connected by means of the universal joint 52, while coil springs 53 may or may not connect the adjacent ends of the units, as desired.

From the foregoing description taken in connection with the accompanying drawings it will be seen that we have devised an electric locomotive of relatively few parts; that the parts are all accessible for inspection and repair and may readily be removed when desired; that by the employment of a universal gear the motor may be geared to the driving axle; and that the motor foundation member as designed will in addition to supporting the motor, also brace the locomotive frames and support the jack shaft.

In accordance with the patent statutes we have described what we now believe to be the best embodiment of the invention, but we do not wish to be understood thereby as limiting ourselves or the scope of the invention, as many changes and modifications may be made without departing from the spirit of the invention; all such we aim to include in the scope of the appended claims.

What we claim as new and desire to secure by Letters Patent is:

1. In an electric locomotive, a truck including driving axles and a jack shaft located therebetween, a vertically disposed motor on said truck, a train of gearing connecting the armature shaft with one or more of the driving axles, and driving rods connecting the driving axles with the truck frame.

2. In an electric locomotive, a truck including driving axles and a jack shaft located therebetween, a vertically disposed motor on said truck, a bevel gear carried by the armature shaft of said motor, a bevel gear and spur gear mounted on said jack shaft, and a universal spur gear on one or both of said axles and in mesh with the spur gear of the jack shaft.

3. In an electric locomotive, a truck including a pair of axles, a pair of frames mounted thereon, a motor, a foundation member for said motor mounted on the frames, said foundation member connecting and bracing the frames, and a pair of extensions on the foundation member extending downwardly between the frames and forming bearings for a jack shaft.

4. In an electric locomotive, a truck including a pair of axles and a jack shaft, a vertically arranged motor having its armature shaft geared to the jack shaft, a foundation member for the motor, a pair of frames mounted on the truck, said foundation member mounted on the frames and forming braces therefor, a pair of extensions on the foundation member forming bearings for the jack shaft, said foundation member also formed with a seat for one of the bearings of the armature shaft.

5. In an electric locomotive, a vertically disposed motor, a foundation member on said truck and on which said motor is mounted, a bevel gear on the lower end of the armature shaft, a bearing for the lower end of said shaft, said bearing being seated in the foundation member and being of greater diameter than the bevel gear, whereby the armature shaft may be disassembled without disturbing the associated parts of the mechanism.

6. In an electric locomotive, a vertically disposed motor, a bearing in the upper wall of the motor casing, a member non-rotatably secured to the upper end of the armature shaft and seated in said bearing, and means for making a relative adjustment between the last-named member and the armature shaft.

7. In an electric locomotive, a truck including driving axles, a vertically disposed motor on said truck, a train of gearing connecting the armature shaft with one or more of the driving axles, and driving rods pivoted to the driving axles and to the truck frame.

8. In an electric locomotive, a truck including a frame and driving axles, a vertically disposed motor on said truck, a jack shaft below said motor, intermeshing bevel gears carried by the armature shaft and said jack shaft, a spur gear carried by the jack shaft, a universal spur gear mounted on one of said axles and meshing with said first-mentioned spur gear, and driving rods connected to said axles and to said frame at points in alignment with said jack shaft.

JOHN PAUL SHAMBERGER.
CLARENCE H. SLAYTON.